(12) United States Patent
Rossi

(10) Patent No.: US 6,268,793 B1
(45) Date of Patent: Jul. 31, 2001

(54) SIGNALLING DEVICE INCLUDING CRASH INDICATION FOR AUTOMOBILES

(76) Inventor: Francesco Rossi, No. 38, Via Eugubina, I-06122 Perugia (PG) (IT)

( * ) Notice: Subject to any disclaimer, the term of this patent is extended or adjusted under 35 U.S.C. 154(b) by 0 days.

(21) Appl. No.: 09/402,888

(22) PCT Filed: Apr. 10, 1999

(86) PCT No.: PCT/IT98/00083

§ 371 Date: Oct. 14, 1999

§ 102(e) Date: Oct. 14, 1999

(87) PCT Pub. No.: WO98/47124

PCT Pub. Date: Oct. 22, 1998

(30) Foreign Application Priority Data

Apr. 15, 1997 (IT) ............................................. PG970009 U

(51) Int. Cl.[7] .................................................. B60Q 1/52
(52) U.S. Cl. .................... 340/471; 340/463; 340/472; 340/473; 340/468; 340/436
(58) Field of Search .................................... 340/471, 463, 340/472, 473, 468, 436

(56) References Cited

U.S. PATENT DOCUMENTS

| | | | |
|---|---|---|---|
| 4,868,542 | * 9/1989 | Thompson | 340/468 |
| 4,928,084 | * 5/1990 | Reiser | 340/479 |
| 5,500,638 | 3/1996 | George | 340/468 |
| 5,630,209 | * 5/1997 | Wizgall et al. | 455/66 |
| 5,825,281 | * 10/1998 | McCreary | 340/425.5 |
| 5,905,434 | * 5/1999 | Steffan et al. | 340/464 |
| 5,914,675 | * 6/1999 | Tognazzini | 340/989 |

FOREIGN PATENT DOCUMENTS

| | | | |
|---|---|---|---|
| 29 20 624 | 12/1980 | (DE) . | |
| 31 27 941 | 2/1983 | (DE) | G09G/3/26 |
| 44 31 190 | 3/1996 | (DE) | B60Q/1/50 |
| 0 214 594 | 3/1987 | (EP) | B60Q/1/50 |
| 0 645 941 | 3/1995 | (EP) | H04Q/7/32 |
| 2 591 973 | 6/1987 | (FR) | B60R/25/00 |
| 2 634 308 | 1/1990 | (FR) | G09F/9/33 |
| 2 208 956 | 4/1989 | (GB) . | |
| WO 94/20335 | 9/1994 | (WO) | B60R/25/10 |

* cited by examiner

Primary Examiner—Daniel J. Wu
Assistant Examiner—Tai T. Nguyen
(74) Attorney, Agent, or Firm—Browdy & Neimark

(57) ABSTRACT

CALL ME-TELEPHONE ME is an electronic device the purpose of which is that of transmitting a telephone number and/or a message to another following vehicle. It is attached to the rear window or the rear panel of the vehicle and is composed of a luminous display. It can be switched on or off according to one's needs simply for a few seconds or for a longer period of time. The luminous display transmits the telephone number or the message which has been programmed for the device by its installer or by whoever is in possession of the device. The programming of the message is done with the keyboard of a computer or a portable phone (an alphanumerial keyboard). Whoever is behind the vehicle and fitted with the device can read the message transmitted. CALL ME-TELEPHONE ME can have a moving display (moving message) or can be direct (direct message) according to what the characters allow in the case of the specific sentence or number of characters (geometric grouping of luminous display in the form of a Union Jack).

7 Claims, 3 Drawing Sheets

SIGNALLING DEVICE INCLUDING CRASH INDICATION FOR AUTOMOBILES

CROSS REFERENCE TO RELATED APPLICATION

The present application is the national stage under 35 U.S.C. 371 of PCT/IT98/00083, filed Apr. 10, 1998.

BACKGROUND OF THE INVENTION

The present invention can be used by all means of transport (automobiles, lorries, articulated lorries, trailers, buses, taxis, campers, service vehicles, pick-up trucks, Public Authority vehicles: Police, Military Police, Ambulances, First Aid vehicles, Highway service vehicles, tractors, caravans, motorcycles, motor vehicles, scooters, mopeds, trains, marine vessels, airplanes, helicopters etc.) and any other form of transport.

The present invention relates to a signalling device for messages for vehicles comprising a display attached to any part of the vehicle where it is visible to other drivers. At least one preprogrammed emergency message is visualizable on the display. The device comprises at least one crash sensor connected to the display. A visible emergency signal through the display is automatically emitted by a vehicle involved in a crash situation.

FR 2634308 discloses a device of the above type wherein the crash sensor is due to the detection of a panic brake action and the visible emergency signal is emitted by a vehicle involved in a crash situation when a panic brake action preceded the crash.

EP 0645941 discloses a signalling device for messages for vehicles comprising a display, attached to any part of the vehicle where it is visible to other drivers, on which at least one preprogrammed emergency message is visualizable. The device allows transmission of short message or general packet radio signal without providing speech communication facility. This known device is used for transport management and coordinating movement of individual vehicles. It comprises a radio transceiver which allows reception and transmission of short messages in both directions using the GSM standards for short message services or general et radio services and is only used for short message transmission. The transceiver may have connection facilities for subscriber input/output peripherals, e.g. a printer, display, or keyboard, with an associated control stage and interface module used with an inserted software module. The interface module may provide an electronic notice board facility.

The prior art comprises also EP 0214594 wherein a vehicle auxiliary warning system is secured to a vehicle rear window shelf for viewing by a trailing vehicle driver. The system includes a display window with a visual warning display device activatable through an electrical circuit connected to the vehicle rear brake light or turn signal circuit. A sensor-discriminator selects one of a number of visual warning displays in response to multiple brake pedal or turn signal circuit activations. The system can include a radio receiver with external antenna and a radio-signal activatable switch connected to the receiver and to the sensor. A selected radio signal received by the antenna can activate the switch to cause a predetermined message be displayed. The radio signal may be emitted by a radio signal broadcaster positioned on the roadside and operated remotely by the local road authority. The arrangement warn the following motorists of the road danger ahead. The system can also include a radar signal emitter-receiver facing rearwardly on the shelf in the rear window of the vehicle so as to direct a radar signal rearwardly. When a trailing vehicle tailgates, the return radar signal causes a warning message to be visualized.

SUMMARY OF THE INVENTION

The subject matter of the invention is defined in claim 1. Advantageous embodiments thereof are defined in the dependent claims.

With the use of the devices described in this patent, there is significant improvement of traffic circulation due to the greater security offered by the devices described and greater ease of traffic circulation in urban and non-urban areas for all drivers who can avail themselves of this new means of intervehicular communication.

CALL ME-TELEPHONE ME is an electronic device the purpose of which is that of transmitting a telephone number and/or a message to another following vehicle. It is attached to the rear window or the rear panel of the vehicle and is composed of a luminous display. It can be switched on or off according to one's needs simply for a few seconds or for a longer period of time. The luminous display transmits the telephone number or the message which has been programmed for the device by its installer or by whoever is in possession of the device. The programming of the message is done with the keyboard of a computer or a portable phone (an alphanumerical keyboard). Whoever is behind the vehicle fitted with the device can read the message transmitted. The various mechanisms of luminous displays have never been used in this way, and have never been used from the interior of an automobile where the direct input is given by the driver.

As well as creating a new source of telephone traffic which would not otherwise exist it proves a device of inestimable worth in the infinite amount of situations which we find ourselves in on the public highway. The use of the device is of great importance also because it is responsible for an increase of communication among people where direct verbal contact would otherwise be impossible.

CALL ME-TELEPHONE ME is to appear in a rear position and can have a moving display (moving message) or can be direct (direct message) according to what the characters allow in the case of the specific sentence or number of characters (geometric grouping of luminous display in the form of a Union Jack). The luminosity of the panel can be regulated with a plastic cover similar to those present on the brake lights of any automobile. CALL ME-TELEPHONE ME can also be connected to the hazard lights of the automobile which will allow others to more clearly visualize the vehicle fitted with the device. It is also possible to provide the automobile with an ulterior luminous, acoustic or flashing warning device thus maximising the possibility of visualization of the vehicle in the case of danger.

CALL ME-TELEPHONE ME can be attached to the rear window, the rear panel of the automobile, the baggage compartment or rear door of the automobile or wherever it is visible to other drivers. It can also be attached to the roof of the vehicle or to any other interior or exterior part of the vehicle where it is visible to other drivers from any direction.

CALL ME-TELEPHONE ME can also be used as a third brake light if it is connected to the brake pedal. In this case the display is illuminated with the preprogrammed message. CALL ME-TELEPHONE ME can be permanently attached in a fixed position or removable. It can also be positioned on a specific rotary bracket which allows CALL ME-TELEPHONE ME to face in any direction so as to be read by those inside and outside the vehicle from any angle.

CALL ME-TELEPHONE ME can be connected to the car battery or have its own power supply. As long as the automobile has its own power supply, it can power CALL ME-TELEPHONE ME. In the event of power failure from the automobile CALL ME-TELEPHONE ME will use its own power supply. The car battery will continually charge the CALL ME-TELEPHONE ME battery.

The luminous display of CALL ME-TELEPHONE ME can also be composed of LED crystals. In this case the area utilizable will be that of an LED display which is superior to that of the simple mechanism illustrated in the UNION JACK system.

It is also possible to attach CALL ME-TELEPHONE ME to a GPS (Global Positioning System) and/or a GSM (Global Standard for Mobile Communication) and vice versa. In this way the driver can both use the luminous display and automatically and/or manually and verbally send a S.O.S. message (e.g. in the case of a breakdown, an accident and/or an emergency situation etc.). By pressing a touch key the driver and/or passenger can make immediate contact with the police or assistance service etc. In so doing he will be able to provide the necessary information regarding position of the vehicle and/or, if the need arises, the best route to reach the vehicle in question. The police and/or assistance service etc. can provide the necessary information for an alternative route and information on traffic in general and/or eventual detours to be taken to allow the driver and/or passenger to change direction according to his needs. With this system the GSM telephone can be utilized as well.

CALL ME-TELEPHONE ME will be manufactured as a base model+accessories comprising all devices listed in the present document.

The TX-RX module in the standby position is constantly active to allow decoding of emergency messages etc. The module entails activation of the RDS system when the car radio is provided with an information panel and sends a vocal message or beep/beep message to the amplifier of the RDS radio.

All devices listed in the present document are to be considered adapted to the SQLCH system.

Rubber protective accessories are to be supplied with CALL ME-TELEPHONE ME to protect the device from vibration of the vehicle and/or from situations deriving from irregular road surfaces etc.

Both the display and casing of CALL ME-TELEPHONE ME are conceived in various colours or in a single colour.

The display is characterized by the fact that it can be programmed with messages (meaning letters and/or numbers and/or symbols or designs etc.) some of which are preprogrammed and ready to be sent and others which can be written (with the necessary keyboard and/or with a computer keyboard and/or with the keyboard of a portable phone and/or with the keyboard of a RDS radio and/or the keyboard of an electronic organizer and/or through the electronic command—voice control) and memorized and sent by the driver and/or passenger according to their needs.

In synthesis the system will be operated by specific software which can be adapted to all existing software described for the devices listed in this patent. Software for a SIM card must also be considered as well as that already in existence for a GSM telephone or any other type of telephone. In this case it will be possible to memorize messages that will be easily displayed with the touch of a button. If a specific keyboard is used and/or that of a computer the software has to be created ex-novo. If the keyboard of an RDS radio is utilized and/or a mobile phone, GSM, or any other type of telephone comprising the software of the SIM card, these devices can be integrated with ulterior software displaying these new characteristics. One or more new touch keys can be integrated into the device to allow manual transmission of information (even if all commands are automatically preprogrammed). Information can also be sought, visualized and sent on the various displays with this method.

The display can be used, not exclusively, with all types of alphanumerical keyboards for the programming and subsequent transmission of messages: alphanumerical keyboard with small display and/or computer keyboard and/or GSM keyboard or any other type of telephone and/or RDS car radio keyboard and/or personal organizer keyboard etc. All keyboards are alphanumerical with letters, numbers, symbols and designs. As already mentioned messages can also be transmitted with the simple voice command programme.

The sensor/s can or can not be combined or separate in their respective functions.

The display can be supplied with a small receiver and transmitter RX TX and can, but not exclusively, be connected to the other devices listed in the present document, so that it can alert all vehicles in a surrounding radius (200–300–400 or more meters) in the other lanes of impending danger due to an accident or any other emergency situation etc. and/or other useful messages regarding physical obstructions and/or safety and/or assistance. In this case there is the possibilty of beep/beep and/or voice call message.

The display is also conceived as an organic mechanism, with a series of messages (letters and/or symbols and/or numbers and/or designs which will have an empty space or a coloured space without messages) and/or rotatable and/or a dot matrix display, manually or automatically interchangeable, preprogrammed and/or to be programmed through the keyboard. In this way messages can be memorized and visualized before being sent. The message can be cancelled at any moment.

Other applications are conceived regarding household electric appliances or devices for the home. In this case the display can signal a state of alarm and/or danger and/or warning inside and/or outside the building (including acoustic support) in the case of gas leaks and/or electrical short circuits and/or power failure and/or fire and/or excessive temperatures of ovens etc. or more simply indication of ringing telephone, door bell and/or electric lights left on and/or water heaters left on etc. In this way it will provide an ulterior system for general check-ups of all household appliances and any other systems for which the device proves useful. It can also be used as a burglar alarm.

Other applications are conceived in the advertising sector and/or interpersonal communication sector. The display can be hand held and/or worn by one or more people, attached to items of clothing (e.g. jacket, shirt et,c.) with the necessary clip or whatever is necessary or exists with which to attach it (e.g. for fairs), and/or used as a key ring and/or to send or leave messages; it is positionable wherever desirable and/or on any item of clothing and/or accessory, with magnetic support etc. to attract greater attention and/or inform other persons of anything while in movement or in a fixed position, of who you are, what you are looking for, what you need, what your profession is etc. With the use of the display there is an improvement of quality of interpersonal communication and living and exchange, to create a new means of visual communication between people.

The system of vocal command or control (denominated VOICE CONTROL in ENGLISH) is conceived but not essential for all the devices listed in the present document this function will allow all devices mentioned to be activated by means of the voice.

BRIEF DESCRIPTION OF THE DRAWINGS

Other possible uses of CALL ME-TELEPHONE ME are illustrated in the following figures.

DESCRIPTION OF THE PREFERRED EMBODIMENTS (a) CALL ME-TELEPHONE ME+/−(plus/minus) SPECIFIC KEYBOARD AND/OR COMPUTER KEYBOARD ETC.+/−(plus/minus) SENSOR/S FOR COLLISION OR CRASH. (FIG. 3)

Figure 1:
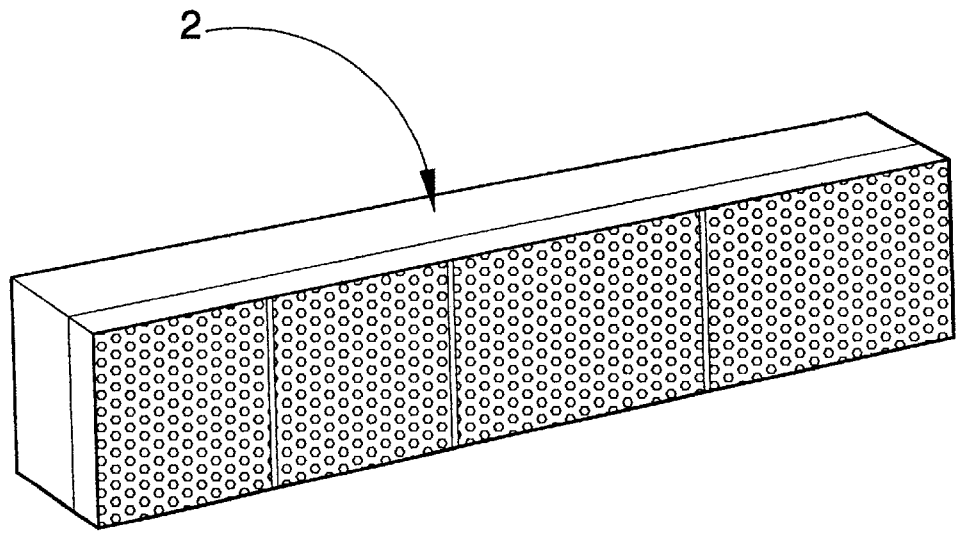
FIG. 1 shows a display CALL ME-TELEPHONE ME.
Figure 2:
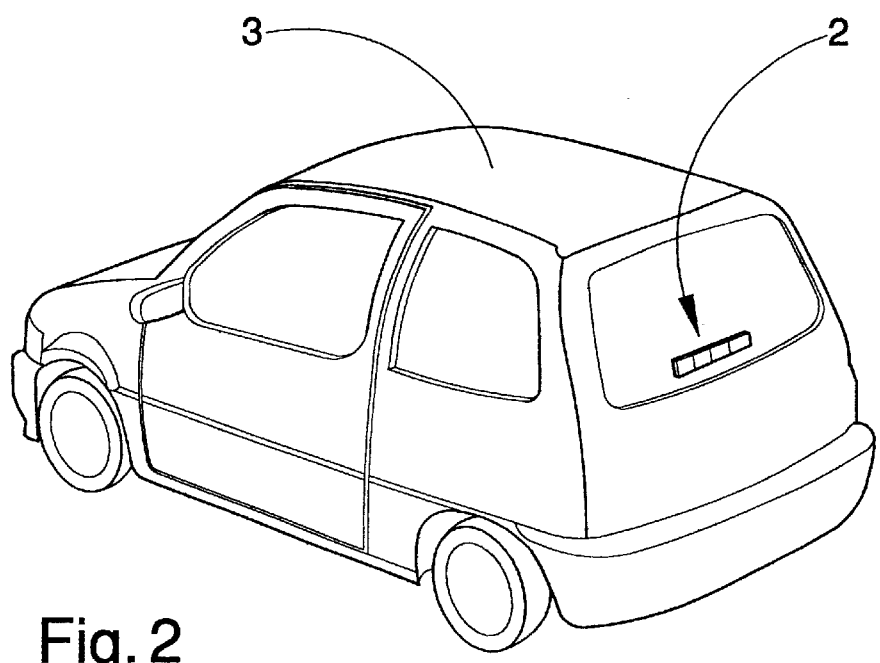
FIG. 2 shows a vehicle having the display of FIG. 1.
Figure 3:
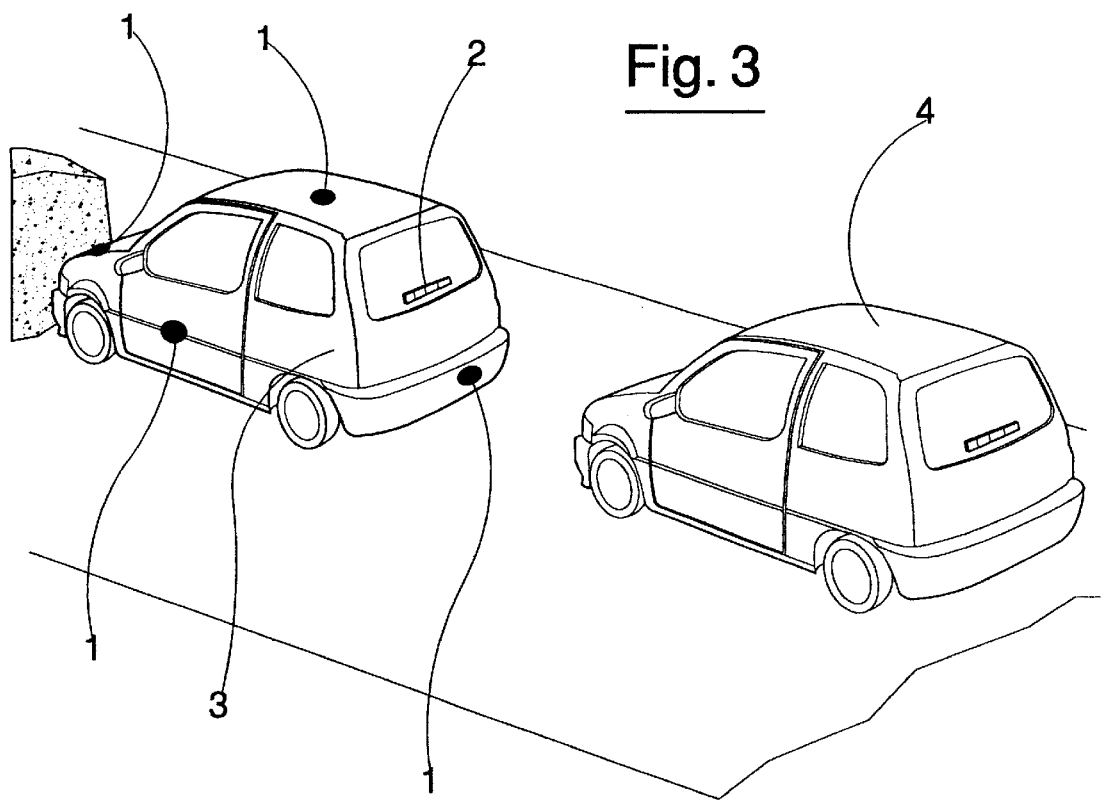
FIG. 3 shows schematically a first embodiment of the invention.

In addition through a system of sensors 1 for collision or crash connected to the device CALL ME-TELEPHONE ME 2 directly, but not exclusively, by cable, the vehicle 3 involved in an accident and/or in an emergency situation can automatically, immediately and with a preprogrammed priority, over other programmed messages already sent, send other messages regarding the emergency situation and/or accident etc. to the vehicles 4 in the vicinity or arriving on the scene. The drivers and/or passengers of the vehicles in the vicinity can thus visualize the messages of emergency situations and/or accidents etc. on the CALL ME-TELEPHONE ME 2 of the vehicle displaying the device involved in the accident (FIG. 3).

Figure 4:
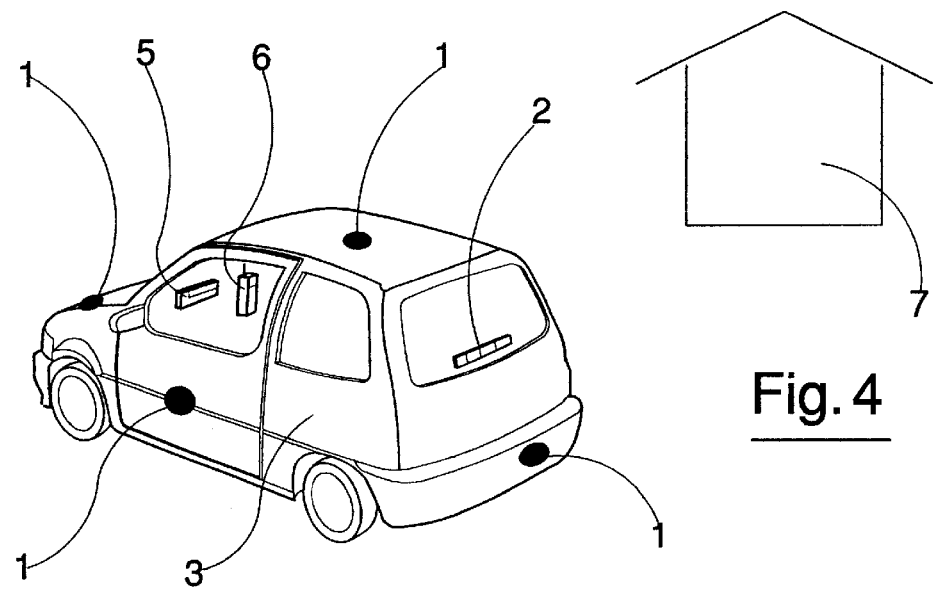
FIG. 4 shows schematically a second embodiment of the invention.

(b) CALL ME-TELEPHONE ME+/−(plus/minus) RDS CAR RADIO and/or GSM TELEPHONE/HANDS FREE KIT/GSM CAR PHONE OR ANY OTHER TYPE OF TELEPHONE+/−(plus/minus) POLICE 113-112 AND/OR CENTRAL ASSISTANCE SERVICE AND/OR ASSISTANCE SERVICE ETC.+/−(plus or minus) SENSOR/S FOR COLLISION OR CRASH. (FIG. 4)

Everything described under letter (a) with the exclusion of; but not indispensable, the specific keyboard and/or computer keyboard etc. can be integrated with the connection to the RDS car radio 5 and/or GSM telephone 6 etc. and/or be connected with the police 113-112 7 etc. Messages can be memorized and sent with the CALL ME-TELEPHONE ME 2 through the alphanumerical keyboard of the RDS car radio and/or a GSM telephone or any other type of telephone etc. In addition the GSM telephone allows the user to contact the police 113-112 etc. both automatically by means of the collision sensors 1 and manually. In addition the driver can visualize the automatic or manual priority emergency message on the RDS display or on the GSM display at the moment of the accident and/or emergency situation etc. (FIG. 4).

Figure 5:
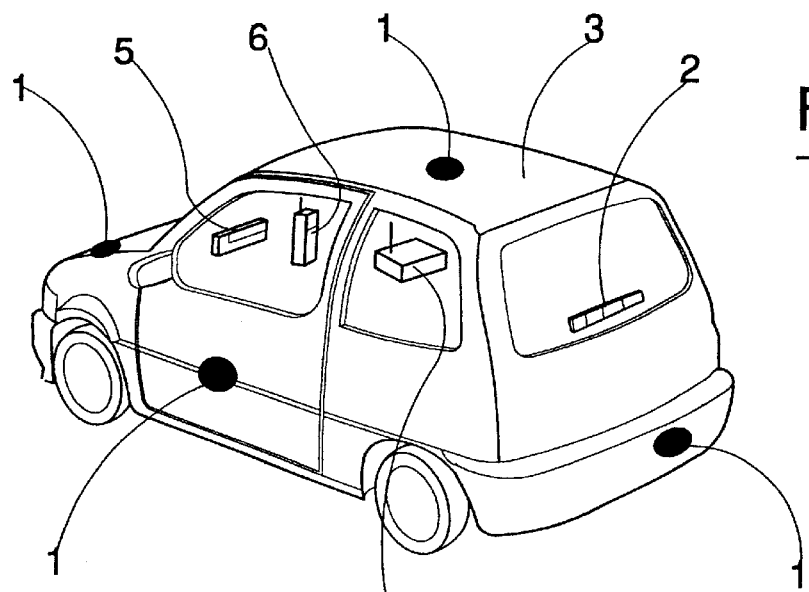
FIG. 5 shows schematically a third embodiment of the invention.

(c) CALL ME-TELEPHONE ME+/−(plus/minus) CAR RADIO RDS and/or GSM TELEPHONE/CAR PHONE/ HANDSFREE KIT OR ANY OTHER TYPE OF TELEPHONE+/−(plus/minus) RX TX+/−(plus/minus) POLICE 113-112 AND/OR CENTRAL ASSISTANCE SERVICE AND/OR ASSISTANCE SERVICE ETC.+/−(plus/minus) SENSOR/S FOR COLLISION OR CRASH. (FIG. 5)

Everything listed under the letters a) and b) can also be integrated with the RX TX system 8. The vehicle involved in the accident and/or in the emergency situation can, in this case, with automatic and/or manual actuation, transmit a signal under the form of an acoustic bip/bip and/or vocal message to all vehicles within a radius of 200–300–400 or more meters can be transmitted.

This system allows the drivers and/or passengers of vehicles in the vicinity of the accident to be acoustically warned in a radius of 200–300–400 or more meters of the imminent danger and/or accident and/or emergency situation.

In addition they can visualize the message on their RDS and/or GSM displays or any other type of telephone etc.

This system is also conceived as a chain link system between vehicles with intermittent messages that can be interrupted when the message is received by the other following vehicles (FIG. 5).

(d) CALL ME-TELEPHONE ME)+/−(plus/minus) RDS CAR RADIO and/or GSM TELEPHONE/CAR PHONE/ HANDSFREE KIT OR ANY OTHER TYPE OF TELEPHONE+/−(plus/minus) RX TX+/−(plus/minus) GPS+/−(plus/minus) POLICE 113-112 AND/OR CENTRAL ASSISTANCE SERVICE AND/OR ASSISTANCE SERVICE ETC.+/−(plus/minus) SENSOR/S FOR COLLISION OR CRASH. (FIG. 6)

Figure 6:
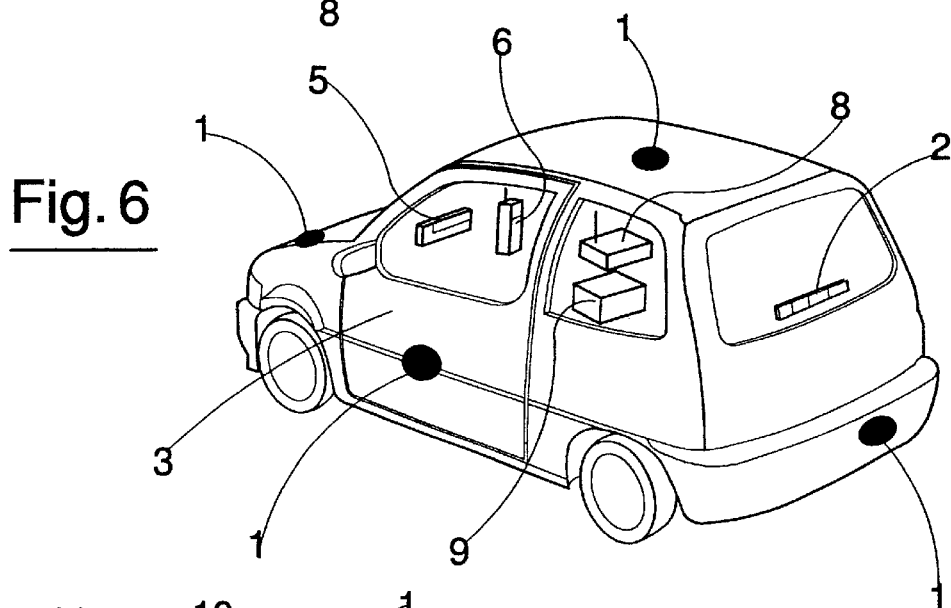
FIG. 6 shows schematically a fourth embodiment of the invention.

Everything listed under the letters (a), (b) and (c) can be integrated with the GPS system 9 that, in addition, allows central assistance services and/or first aid and/or emergency relief services etc. to localize the position of the vehicle involved in the accident (FIG. 6).

(e) SENSOR/S FOR COLLISION OR CRASH+/−(plus/ minus) RX TX+/−(plus/minus) VOCAL SYNTHESIS+/− (plus/minus) EMERGENCY DENSITY LIGHT AND/OR LED CRYSTALS AND/OR DISPLAYS ETC.+/−(plus/ minus) DISPLAY (CALL ME-TELEPHONE ME). (FIG. 7)

Through a system of one or more sensors 1 for collision or crash situations connected to the RX TX system, vocal synthesis system, connected to one or more loudspeakers 10, and/or connected to one or more light systems 11 and/or led's and/or displays etc. positioned inside the vehicle, and possibly connected to the CALL ME-TELEPHONE ME device 2 can integrate with and simplify the operations to be conducted described under the letters (a), (b), (c) and (d).

Figure 7:
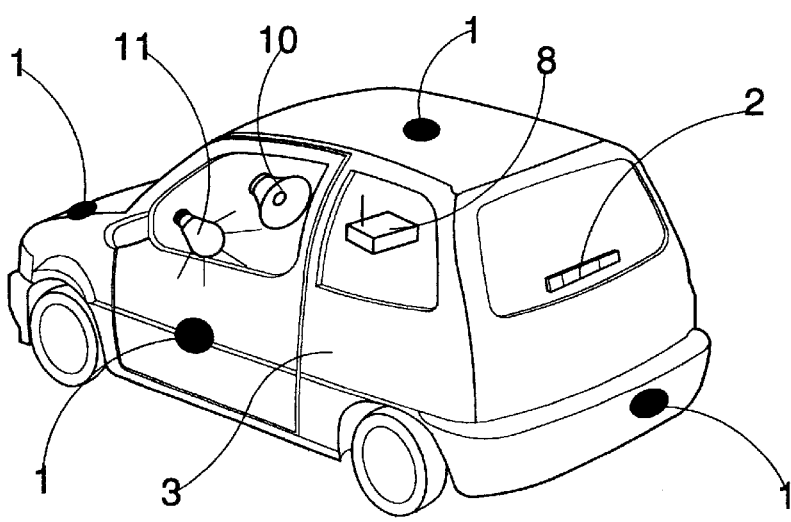
FIG. 7 shows schematically a fifth embodiment of the invention.

In this case the driver of the vehicle involved in the accident and/or emergency situation manually or automatically emits a visible signal through the CALL ME-TELEPHONE ME 2 and a signal via air to the vehicles in the vicinity (FIG. 7).

The systems described at the letters (a, b, c, d, e) can be considered autonomous or otherwise connected. They can complete their functions separately and/or in the absence of one or more devices. All CALL ME-TELEPHONE ME models described in the present document have been conceived with an alphanumencal anti-theft device which allows visualization of the theft on the CALL ME-TELEPHONE ME device with relevant wording and in the case of the vehicle being fitted with GPS the location of the vehicle can also be determined.

The channel used for RX TX to avoid immission from other sources can be supplied with a SKIFT channel and/or an access key for that frequency (crypted base frequency).

What is claimed is:

1. Signalling device for messages for vehicles, comprising a display (2) attached to any part of the vehicle (3) where it is visible to other drivers, at least one preprogrammed emergency message being visualizable on the display (2); at least one crash sensor (1) connected to the display (2), a visible emergency signal through the display being automatically emitted by a vehicle involved in a crash situation; characterized in that it comprises a receiver-transmitter (8) connected to the display (2), the receiver-transmitter in a standby position allowing decoding of emergency messages, a visible emergency signal through the display (2) being emittable by a vehicle involved in an emergency situation, the at least one crash sensor (1) being connected to the receiver-transmitter (8), an emergency signal via air through the receiver-transmitter being automatically emitted by a vehicle involved in a crash situation.

2. Signalling device as in claim 1, characterized in that an emergency signal via air through the receiver-transmitter (8) is emittable by a vehicle involved in an emergency situation.

3. Signalling device as in claim 1, characterized in that a message on the display (2) can be written with a keyboard.

4. Signalling device as in claim 1, characterized in that a message on the display (2) can be written through an electronic command-voice control.

5. Signalling device as in claim 1, characterized in that it is integrated with the connection to a device (6, 9) that allows the user to contact a police and/or central assistance service (7) automatically when the collision sensor (1) is activated.

6. Signalling device as in claim 1, characterized in that at least one touch key is integrated into the device to allow manual transmission of information that can be visualized on the display (2).

7. Signalling device as in claim 1, characterized in that the display (2) is connected to a Global Positioning System (9) and/or a Global Standard for Mobile Communication (6) so that the driver can send an S.O.S. message in the case of an accident and/or an emergency situation.

* * * * *